(12) United States Patent
Gu et al.

(10) Patent No.: US 9,071,026 B2
(45) Date of Patent: Jun. 30, 2015

(54) ENERGY-SAVING CONTROL DEVICE AND ENERGY-SAVING CONTROL METHOD AND POWER ADAPTER INCLUDING THE SAME

(75) Inventors: Yuan-Qiang Gu, Shanghai (CN); Guo-Jun Wang, Shanghai (CN); De-Zhi Jiao, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 591 days.

(21) Appl. No.: 13/525,386

(22) Filed: Jun. 18, 2012

(65) Prior Publication Data

US 2013/0200724 A1 Aug. 8, 2013

(30) Foreign Application Priority Data

Feb. 8, 2012 (CN) .......................... 2012 1 0027797

(51) Int. Cl.
*H01H 35/00* (2006.01)
*H02M 3/00* (2006.01)
*H01R 13/703* (2006.01)
*H02M 1/00* (2007.01)

(52) U.S. Cl.
CPC .............. *H01R 13/703* (2013.01); *H01H 35/00* (2013.01); *H02M 3/00* (2013.01); *H02M 2001/0032* (2013.01); *Y02B 70/16* (2013.01)

(58) Field of Classification Search
CPC ................... H01H 35/00; H02M 3/00; H02M 2001/0032; Y02B 70/16; H01R 13/703
USPC ................................................... 307/116, 119
See application file for complete search history.

(56) References Cited

U.S. PATENT DOCUMENTS 7,910,833 B2 *  3/2011  McGinley et al. ............ 174/112
8,242,359 B2 *  8/2012  McGinley et al. ............. 174/36

* cited by examiner

*Primary Examiner* — Hal Kaplan
(74) *Attorney, Agent, or Firm* — CKC & Partners Co., Ltd.

(57) ABSTRACT

The present disclosure provides an energy-saving control device, the control method and a power adapter including the energy-saving control device. The energy-saving control device comprises a mechanical switch having a first end and a second end, wherein the second end is an output end of the switch; a controller of which an input terminal is connected to the output end of the mechanical switch and an output terminal outputs a switching control signal; and a power converter for receiving the switching control signal from the controller, wherein the power converter is operated according to the switching control signal. When a connection cable is plugged into or removed from a cable interface, the first end and the second end of the mechanical switch are contacted or separated.

20 Claims, 5 Drawing Sheets

ENERGY-SAVING CONTROL DEVICE AND ENERGY-SAVING CONTROL METHOD AND POWER ADAPTER INCLUDING THE SAME

RELATED APPLICATIONS

This application claims priority to Chinese Application Serial Number 201210027797.5, filed Feb. 8, 2012, which is herein incorporated by reference.

BACKGROUND

1. Field of Invention

The present disclosure relates to a power adapter. More particularly, the present disclosure relates to an energy-saving control device of the power adapter and an energy-saving control method.

2. Description of Related Art

A power adapter is generally used as a power conversion device for a power supply of a small-scale portable electronic device or electronic apparatus. The power adapter can be classified into an AC (Alternating Current) outputting manner and a DC (Direct Current) outputting manner according to its outputting type, or into a plug-in and a desktop according to its connection manner. In human daily life, especially, the power adapter having the DC outputting manner is more widely applied, such as an electronic device like a cordless-and-base telephone, a game console, a language repeater, a personal stereo, a notebook computer, a tablet computer and a cellular telephone.

In the prior art, in order to reduce the energy consumption of the power adapter, the core component (such as, the power converter) of the power adapter is often operated in a hiccup mode under a no-load condition. Generally, if the electronic device is electrically connected with the power adapter, it represents that the power adapter has carried a load; and when the electronic device is separated from the power adapter, it represents that the power adapter doesn't carry the load or the power adaptor is in a no-load state. Therefore, detecting the load of the power adapter is an important step for achieving energy saving. Currently, there are two typical load detection to manners. One is to detect a voltage signal from an ID pin of a cable interface, so as to determine whether a connection cable in the power adapter is plugged into an electronic device. For example, when the voltage on the ID pin is a low level, the detection circuit sends a control signal to the PWM controller for enabling the power converter to be operated at a normal working mode. Once the voltage on the ID pin is changed to a high level, the detection circuit sends another control signal to the PWM controller for switching the power converter from the normal working mode to the hiccup mode, thereby achieving the energy-saving effect. The other is to detect a resistance value between a voltage pin and a ground terminal, thus determining whether the power adapter is removed from the electronic device in accordance with the detected resistance value. However, no matter which of the aforementioned manners is used, a lot of electronic components are required and more layout space on a printed circuit board (PCB) is occupied, thus increasing the manufacturing cost of the power adapter.

In view of this, many in the industry are endeavoring to find ways in which to design a novel power adapter, so as to detect whether the power adapter is electrically separated from the electronic device with low cost, and thereby adjusting the working mode of the power converter to achieve the energy-saving purpose.

SUMMARY

In order to solve the aforementioned operation disadvantages of a conventional power adapter, the present disclosure provides an energy-saving control device, an energy-saving control method and a power adapter including the energy-saving control device.

An aspect of the present disclosure is to provide an energy-saving control device applicable to a power adapter. The energy-saving control device includes a mechanical switch, a controller and a power converter. The mechanical switch is set on a cable interface of the power adapter. The mechanical switch has a first end and a second end, wherein the second end is an output end of the mechanical switch. The controller has an input terminal and an output terminal. The input terminal of the controller is connected to the output end of the mechanical switch, and the output terminal of the controller outputs a switching control signal. The power converter is connected to the output terminal of the controller for receiving the switching control signal from the controller, wherein the power converter is operated according to the switching control signal. When a connection cable is plugged into the cable interface, the mechanical switch outputs a first signal to the controller, and the controller outputs a first switching control signal corresponding to the first signal to control the power converter to be operated at a normal mode. When a connection cable is removed from the cable interface, the mechanical switch outputs a second signal to the controller, and the controller outputs a second switching control signal corresponding to the second signal to control the power converter to be operated at a hiccup mode.

In one embodiment, the first end of the mechanical switch is connected to a ground voltage, and the second end of the mechanical switch is connected to a DC voltage.

In one embodiment, when the connection cable is plugged into the cable interface, the first end and the second end of the mechanical switch are contacted; and when the connection cable is removed from the cable interface, the first end and the second end of the mechanical switch are separated.

In one embodiment, when the connection cable is plugged into the cable interface, the first signal is a low potential; and when the connection cable is removed from the cable interface, the second signal is a high potential.

In one embodiment, when the connection cable is plugged into the cable interface, the first signal is a high potential; and when the connection cable is removed from the cable interface, the second signal is a low potential.

In one embodiment, the cable interface is a USB (Universal Serial Bus) interface. The mechanical switch is set in the USB interface. When the connection cable is plugged into the USB interface, the first end and the second end of the mechanical switch are contacted; and when the connection cable is removed from the USB interface, the first end and the second end of the mechanical switch are separated.

In one embodiment, the cable interface has a circular jack structure.

In one embodiment, the controller is a PWM controller.

Another aspect of the present disclosure is to provide a power adapter. The power adapter includes an input end, an output end, a controller and a power converter. The input end is electrically connected to a power supply, for receiving an AC power or DC power from the power supply.

The output end includes a cable interface on which a mechanical switch is set. The mechanical switch has a first end and a second end, wherein the second end is an output end of the mechanical switch. The controller has an input terminal and an output terminal. The input terminal of the controller is connected to the output end of the mechanical switch, and the output terminal of the controller outputs a switching control signal. The power converter is connected to the output terminal of the controller for receiving the switching control signal from the controller, wherein the power converter is operated according to the switching control signal. When a connection cable is plugged into the cable interface, the mechanical switch outputs a first signal to the controller, and the controller outputs a first switching control signal corresponding to the first signal to control the power converter to be operated at a normal mode. When a connection cable is removed from the cable interface, the mechanical switch outputs a second signal to the controller, and the controller outputs a second switching control signal corresponding to the second signal to control the power converter to be operated at a hiccup mode.

In one embodiment, the first end of the mechanical switch is connected to a ground voltage, and the second end of the mechanical switch is connected to a DC voltage.

In one embodiment, when the connection cable is plugged into the cable interface, the first end and the second end of the mechanical switch are contacted; and when the connection cable is removed from the cable interface, the first end and the second end of the mechanical switch are separated.

In one embodiment, when the connection cable is plugged into the cable interface, the first signal is a low potential; and when the connection cable is removed from the cable interface, the second signal is a high potential.

In one embodiment, the cable interface is a USB (Universal Serial Bus) interface. The mechanical switch set in the USB interface includes a flexible structure. When the connection cable is plugged into the cable interface, the flexible structure is deformed such that the first end and the second end of the mechanical switch are contacted; and when the connection cable is removed from the cable interface, the flexible structure recovers to the original state such that the first end and the second end of the mechanical switch are separated.

In one embodiment, the controller is a PWM controller.

A further aspect of the present disclosure provides an energy-saving control method for a power adapter including a cable interface. This method includes: providing a mechanical switch set on the cable interface, in which the mechanical switch has a first end and a second end, and the second end is an output end of the mechanical switch; providing a controller, and connecting an input terminal of the controller to the output end of the mechanical switch so as to output a switching control signal through an output terminal of the controller; providing a power converter for receiving the switching control signal from the controller, wherein the power converter is operated according to the switching control signal.

In one embodiment, when a connection cable is plugged into the cable interface, the mechanical switch outputs a first signal to the controller, and the controller outputs a first switching control signal corresponding to the first signal to control the power converter to be operated at a normal mode.

In one embodiment, when a connection cable is removed from the cable interface, the mechanical switch outputs a second signal to the controller, and the controller outputs a second switching control signal corresponding to the second signal to control the power converter to be operated at a hiccup mode.

In one embodiment, the cable interface is a USB interface or has a circular jack structure.

By adopting the energy-saving control device and the energy-saving control method of the present disclosure, a mechanical switch is set on a cable interface of a power adapter to detect whether the connection cable is plugged into or removed from power adapter by turning on or off the mechanical switch, and correspondingly, the power converter is operated at a normal mode or an energy-saving hiccup mode, thereby reaching an energy-saving purpose. Compared with the prior art, the energy-saving control device of the present disclosure has a simple design and low cost, as well as high reliability in load detection.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
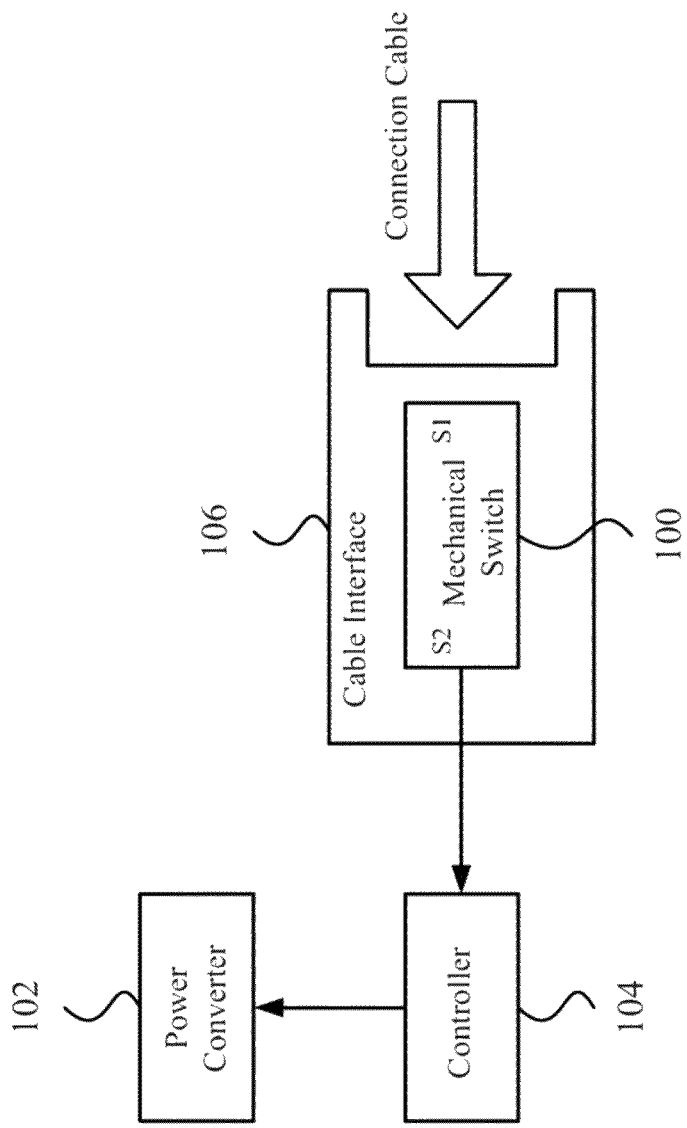
FIG. 1 illustrates a structural block diagram of an energy-saving control device for a power adapter according to an aspect of the present disclosure.

In order to make the description of the present disclosure more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present disclosure. Moreover, the accompanying drawings are only illustrative and are not made according to the original size.

Specific implementations in various aspects of the present disclosure are further described in details below with reference to the accompanying drawings.

FIG. 1 illustrates a structural block diagram of an energy-saving control device for a power adapter according to an aspect of the present disclosure.

Referring to FIG. 1, the energy-saving control device includes a mechanical switch 100, a power converter 102 and a controller 104. The mechanical switch 100 is set on a cable interface 106 of the power adapter. The mechanical switch 100 has a first end S1 and a second end S2, and the second end S2 is an output end of the mechanical switch 100. The controller 104 has an input terminal and an output terminal. The input terminal of the controller 104 is connected to the output end S2 of the mechanical switch 100, and the output terminal of the controller 104 outputs a switching control signal. The power converter 102 is a core component of the power adapter for converting the AC power or DC power provided by the power supply into the DC power required by an electronic device. However, those of skills in the art should understand that, in some other specific embodiments, the power converter of the present disclosure may also be an AC-AC power converter.

The power converter 102 is connected to the output terminal of the controller 104 for receiving the switching control signal from the controller 104, wherein the power converter 102 is operated according to the switching control signal. More particularly, when the connection cable is plugged into the cable interface 106, the second end S2 (i.e., the output end) of the mechanical switch 100 outputs a first signal to the input terminal of the controller 104, and the controller 104 outputs a first switching control signal corresponding to the first signal to control the power converter 102 to be operated at a normal mode. When the connection cable is removed from the cable interface 106, the second end S2 (i.e., the output end) of the mechanical switch 100 outputs a second signal to the input terminal of the controller 104, and the controller 104 outputs a second switching control signal corresponding to the second signal to control the power converter 102 to be operated at a hiccup mode.

Those skilled in the art should also understand that FIG. 1 not only clearly illustrates a structural block diagram of an energy-saving control device for a power adapter, but also clearly illustrates a structural block diagram of a power adapter including the energy-saving control device. For purpose of simplicity, it will not be illustrated in details any further herein.

Figure 2:
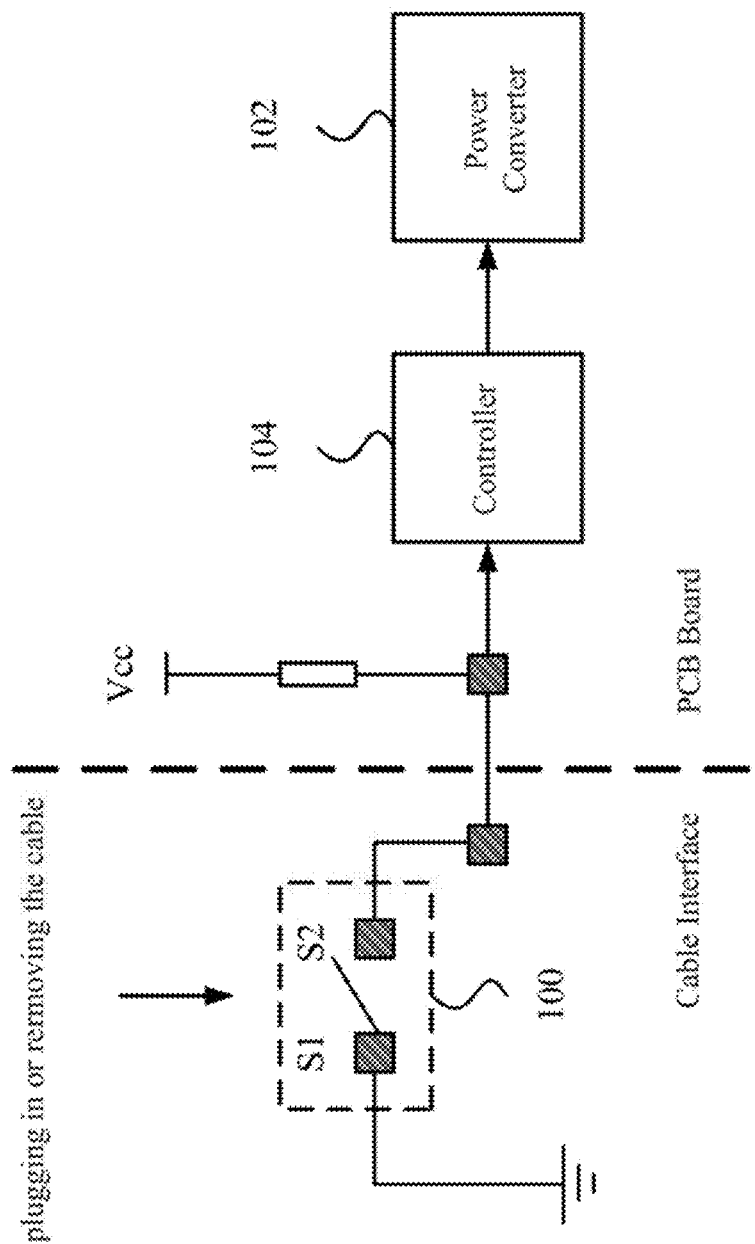
FIG. 2 illustrates a schematic circuit diagram of the energy-saving control device shown in FIG. 1 according to an embodiment of the present disclosure.

FIG. 2 illustrates a schematic circuit diagram of the energy-saving control device shown in FIG. 1 according to an embodiment of the present disclosure. Referring to FIG. 2, the first end S1 of the mechanical switch 100 is grounded, and the second end S2 (i.e., the output end) of the mechanical switch 100 is coupled to a predetermined DC voltage Vcc and the input terminal of the controller 104. In this embodiment, when the connection cable is plugged into the cable interface 106, the mechanical switch 100 is turned on, and the first end S1 and the second end S2 of the mechanical switch 100 are contacted. Because the first end S1 of the mechanical switch 100 is grounded, the potential at the output end S2 of the mechanical switch 100 is decreased to a ground potential. That is, the mechanical switch 100 outputs the first signal which is a low potential signal to the input terminal of the controller 104, and the controller 104 outputs the first switching control signal corresponding to the first signal to control the power converter 102 to be operated at a normal mode with a load. When the connection cable is removed from the cable interface 106, the mechanical switch 100 is turned off, and the first end S1 and the second end S2 of the mechanical switch 100 are separated. Because the second end S2 of the mechanical switch 100 is connected to a predetermined DC voltage Vcc, the potential at the output end S2 of the mechanical switch 100 is increased to the potential Vcc. That is, the output end of the mechanical switch 100 outputs the second signal which is a high potential signal to the input terminal of the controller 104, and the controller 104 outputs the second switching control signal corresponding to the second signal to control the power converter 102 to be operated at a hiccup mode with no-load.

In an embodiment of the present disclosure, the input terminal of the controller 104 is an enable terminal. When the enable terminal is a low potential, the controller 104 outputs the first switching control signal to control the power converter 102 to be operated at a normal mode with a load; and when the enable terminal is a high potential, the controller 104 outputs the second switching control signal to control the power converter 102 to be operated at a hiccup mode with no-load.

It should be specially pointed out that, in the energy-saving control device for the power adapter of the present disclosure, the second end S2 of the mechanical switch 100 is coupled to a DC voltage Vcc. When the connection cable is plugged into the cable interface 106, the first end S1 and the second end S2 of the mechanical switch 100 are contacted, and the second end S2 (i.e., the output end) of the mechanical switch 100 is a low potential; and when the connection cable is removed from the cable interface 106, the first end S1 and the second end S2 of the mechanical switch 100 are separated, and the second end S2 (i.e., the output end) of the mechanical switch 100 is a high potential. At the same time, whether the power adapter is in a loading state or a no-load state is detected according to the potential change at the second end S2 of the mechanical switch 100, so as to subsequently control the power converter 102 to be operated at a normal mode according to a first switching control signal representing a loading state, or control the power converter 102 to be operated at a hiccup mode according to a second switching control signal representing a no-load state. Compared with the prior art, the energy-saving control device of the present disclosure only needs a mechanical switch with a simple structure for easily detecting the load condition of the power adapter to enable the power converter to be operated at an energy-saving mode.

In the embodiment of the present disclosure, when the connection cable is plugged into the cable interface 106, the mechanical switch 100 outputs a low potential signal to the controller 104, and the controller 104 outputs the first switching control signal to control the power converter 102 to be operated at a normal mode with a load. When the connection cable is removed from the is cable interface 106, the mechanical switch 100 outputs a high potential signal to the controller 104, and the controller 104 outputs the second switching control signal to control the power converter 102 to be operated at a hiccup mode with no-load.

In another embodiment of the present disclosure, it can be designed that when the connection cable is plugged into the cable interface 106, the mechanical switch 100 outputs a high potential signal to the controller 104, and the controller 104 outputs the first switching control signal to control the power converter 102 to be operated at a normal mode with a load. When the connection cable is removed from the cable interface 106, the mechanical switch 100 outputs a low potential signal to the controller 104, and the controller 104 outputs the second switching control signal to control the power converter 102 to be operated at a hiccup mode with no-load.

In an embodiment of the present disclosure, the controller 104 is a PWM controller, and the first switching control signal is a first pulse-width control signal for controlling the power converter 102 to be operated at a normal mode with a load, and the second switching control signal is a second pulse-width control signal for controlling the power converter 102 to be operated at a hiccup mode with no-load.

Figure 3:
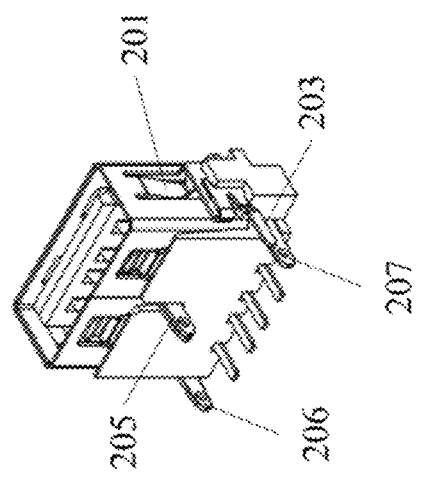
FIG. 3 illustrates a schematic view of the mechanical switch set on the cable interface of the power adapter in the energy-saving control device shown in FIG. 1 according to an embodiment of the present disclosure.

FIG. 3 illustrates a schematic view of the mechanical switch set on the cable interface of the power adapter in the energy-saving control device shown in FIG. 1 according to an embodiment of the present disclosure.

Referring to FIG. 3, the cable interface is a USB (Universal Serial Bus) interface. The mechanical switch 100 is set in the USB interface. When the connection cable is plugged into the USB interface, the first end and the second end of the mechanical switch 100 are contacted; and when the connection cable is removed from the USB interface, the first end and the second end of the mechanical switch 100 are separated.

In a specific embodiment, the USB interface includes a detecting pin 203 which is the second end S2 (i.e., the output end) of the mechanical switch 100. The detecting pin 203 is connected to the input terminal of the controller 104 and the DC voltage Vcc. The USB interface also includes pins 205, 206 and 207 (i.e., the first end S1 of the mechanical switch 100) which are all connected to the ground voltage. When the connection cable is plugged into the USB interface, the first end S1 and the second end S2 of the mechanical switch 100 are contacted, and the output end of the mechanical switch 100 outputs a low potential signal which does not affect the controller 104, such that the power converter 102 is still operated at a normal mode; and when the connection cable is removed from the USB interface, the first end. S1 and the second end S2 of the mechanical switch 100 are separated, and the output end of the mechanical switch 100 outputs a high potential signal which enables the controller 104 to output a switching control signal to control the power converter 102 to be operated at a hiccup mode, i.e., the energy-saving mode.

In another embodiment of the present disclosure, the mechanical switch 100 includes a flexible structure 201. When the connection cable is plugged into the cable interface, the flexible structure 201 is deformed to enable the first end S1 and the second end S2 of the mechanical switch 100 to be contacted; and when the connection cable is removed from the cable interface, the flexible structure 201 recovers to the original state to separate the first end S1 of the mechanical switch 100 from the second end S2 of the mechanical switch 100.

Figure 4:
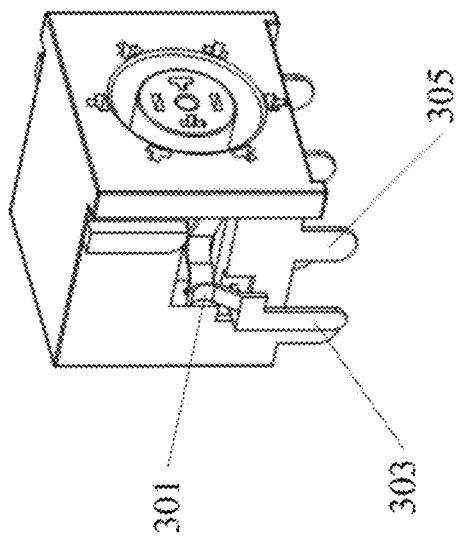
FIG. 4 illustrates a schematic view of the mechanical switch set on the cable interface of the power adapter in the energy-saving control device shown in FIG. 1 according to another embodiment of the present disclosure.

FIG. 4 illustrates a schematic view of the mechanical switch set on the cable interface of the power adapter in the energy-saving control device shown in FIG. 1 according to another embodiment of the present disclosure.

Referring to FIG. 4, the cable interface has a circular jack structure. A mechanical switch 100 (marked as 301) is set on the cable interface for detecting whether the connection cable is plugged into the circular jack structure. In a specific embodiment, the circular jack structure also includes a detecting pin 303, i.e., the second end S2 (i.e., the output end) of the mechanical switch 100. The detecting pin 303 is connected to the input terminal of the controller 104 and the DC voltage Vcc. The circular jack structure also includes a pin 305 connected to the ground voltage, i.e., the first end S1 of the mechanical switch 100.

Similar to FIG. 3, the mechanical switch 100 includes a flexible structure set at an internal side of the circular jack structure. When the connection cable is plugged into the circular jack structure, the flexible structure is deformed to enable the first end S1 of the mechanical switch 100 and the second end S2 of the mechanical switch 100 to be contacted; and when the connection cable is removed from the circular jack structure, the flexible structure recovers to the original state to separate the first end S1 of the mechanical switch 100 from the second end S2 of the mechanical switch 100. In this way, it is detected whether the connection cable is plugged into the circular jack structure, i.e., whether the power adapter is operated at a loading sate or a no-load state.

Figure 5:
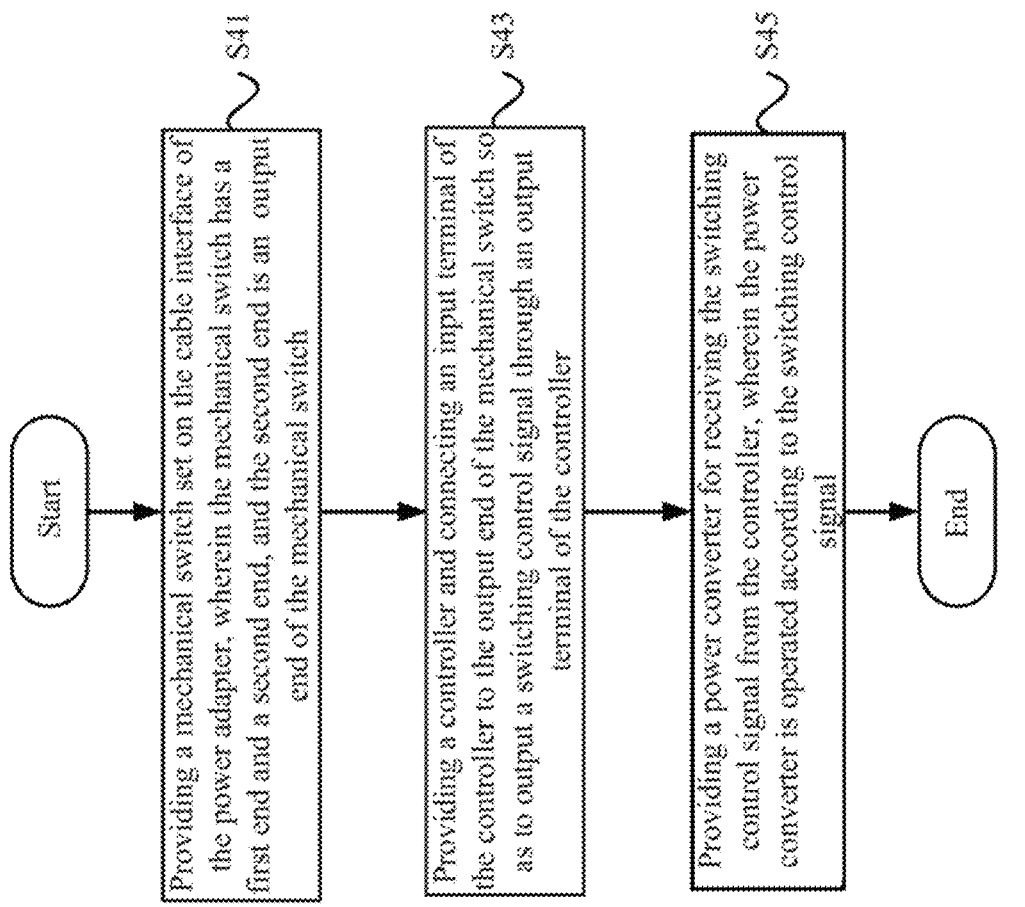
FIG. 5 illustrates a flow chart showing an energy-saving control method for a power adapter according to another aspect of the present disclosure.

FIG. 5 illustrates a flow chart showing an energy-saving control method for a power adapter according to another aspect of the present disclosure. Referring to FIG. 5, in the energy-saving control method, step S41 is first performed for providing a mechanical switch set on a cable interface of the power adapter. The mechanical switch has a first end and a second end, and the second end is an output end of the mechanical switch. Subsequently, step S43 is performed for providing a controller and connecting an input terminal of the controller to the output end of the mechanical switch so as to output a switching control signal through an output terminal of the controller. Afterwards, step S45 is performed for providing a power converter for receiving the switching control signal from the controller, wherein the power converter is operated according to the switching control signal.

In a specific embodiment, when a connection cable is plugged into the cable interface of the power adapter, the mechanical switch outputs a first signal to the controller, and the controller outputs a first switching control signal corresponding to the first signal to control the power converter to be operated at a normal mode. For example, the first signal is a low potential. Alternatively, for example, the first signal is a high potential.

In another specific embodiment, when a connection cable is removed from the cable interface of the power adapter, the mechanical switch outputs a second signal to the controller, and the controller outputs a second switching control signal corresponding to the second signal to control the power converter to be operated at a hiccup mode. For example, the second signal is a high potential. Alternatively, for example, the second signal is a low potential.

By adopting the energy-saving control device and the energy-saving control method of the present disclosure, a mechanical switch is set on a cable interface of a power adapter to detect whether the connection cable is plugged into or removed from power adapter by turning on or off the mechanical switch, and correspondingly, the power converter is operated at a normal mode or an energy-saving hiccup mode, thereby reaching an energy-saving purpose. Compared with the prior art, the energy-saving control device has a simple design and low cost, as well as high reliability in loading testing.

Although the present disclosure has been disclosed with reference to the above embodiments, these embodiments are not intended to limit the present disclosure. It will be apparent to those of skills in the art that various modifications and variations can be made without departing from the spirit and scope of the present disclosure. Therefore, the scope of the present disclosure shall be defined by the appended claims.

What is claimed is:

1. An energy-saving control device applicable to a power adapter, comprising:
    a mechanical switch set on a cable interface of the power adapter, wherein the mechanical switch has a first end and a second end, and the second end is an output end of the mechanical switch;
    a controller having an input terminal and an output terminal, wherein the input terminal of the controller is connected to the output end of the mechanical switch, and the output terminal of the controller outputs a switching control signal; and
    a power converter connected to the output terminal of the controller for receiving the switching control signal from the controller, wherein the power converter is operated according to the switching control signal,
    wherein when a connection cable is plugged into the cable interface, the mechanical switch outputs a first signal to the controller, and the controller outputs a first switching control signal corresponding to the first signal to control the power converter to be operated at a normal mode; and when a connection cable is removed from the cable interface, the mechanical switch outputs a second signal to the controller, and the controller outputs a second switching control signal corresponding to the second signal to control the power converter to be operated at a hiccup mode.

2. The energy-saving control device of claim 1, wherein the first end of the mechanical switch is connected to a ground voltage, and the second end of the mechanical switch is connected to a DC (Direct Current) voltage.

3. The energy-saving control device of claim 2, wherein when the connection cable is plugged into the cable interface, the first signal is a low potential; and when the connection cable is removed from the cable interface, the second signal is a high potential.

4. The energy-saving control device of claim 1, wherein when the connection cable is plugged into the cable interface, the first end and the second end of the mechanical switch are contacted; and when the connection cable is removed from the cable interface, the first end and the second end of the mechanical switch are separated.

5. The energy-saving control device of claim 1, wherein when the connection cable is plugged into the cable interface, the first signal is a high potential; and when the connection cable is removed from the cable interface, the second signal is a low potential.

6. The energy-saving control device of claim 1, wherein the cable interface is a USB interface.

7. The energy-saving control device of claim 6, wherein the mechanical switch is set in the USB interface, and when the connection cable is plugged into the USB interface, the first end and the second end of the mechanical switch are contacted; and when the connection cable is removed from the USB interface, the first end and the second end of the mechanical switch are separated.

8. The energy-saving control device of claim 1, wherein the cable interface has a circular jack structure.

9. The energy-saving control device of claim 1, wherein the controller is a PWM controller.

10. A power adapter, comprising:
an input end electrically connected to a power supply for receiving an AC power or DC power from the power supply;
an output end comprising a cable interface on which a mechanical switch is set, wherein the mechanical switch has a first end and a second end, and the second end is an output end of the mechanical switch;
a controller having an input terminal and an output terminal, wherein the input terminal of the controller is connected to the output end of the mechanical switch, and the output terminal of the controller outputs a switching control signal; and
a power converter connected to the output terminal of the controller for receiving the switching control signal from the controller, wherein the power converter is operated according to the switching control signal,
wherein, when a connection cable is plugged into the cable interface, the mechanical switch outputs a first signal to the controller, and the controller outputs a first switching control signal corresponding to the first signal to control the power converter to be operated at a normal mode; and when a connection cable is removed from the cable interface, the mechanical switch outputs a second signal to the controller, and the controller outputs a second switching control signal corresponding to the second signal to control the power converter to be operated at a hiccup mode.

11. The power adapter of claim 10, wherein the first end of the mechanical switch is connected to a ground voltage, and the second end of the mechanical switch is connected to a DC voltage.

12. The power adapter of claim 11, wherein when the connection cable is plugged into the cable interface, the first signal is a low potential; and when the connection cable is removed from the cable interface, the second signal is a high potential.

13. The power adapter of claim 10, wherein when the connection cable is plugged into the cable interface, the first end and the second end of the mechanical switch are contacted; and when the connection cable is removed from the cable interface, the first end and the second end of the mechanical switch are separated.

14. The power adapter of claim 10, wherein the cable interface is a USB interface.

15. The power adapter of claim 14, wherein the mechanical switch set in the USB interface comprises a flexible structure, and when the connection cable is plugged into the cable interface, the flexible structure is deformed to enable the first end and the second end of the mechanical switch to be contacted; and when the connection cable is removed from the cable interface, the flexible structure is recovered to the original state so as to separate the first end of the mechanical switch from the second end of the mechanical switch.

16. The power adapter of claim 10, wherein the controller is a PWM controller.

17. An energy-saving control method for a power adapter comprising a cable interface, the energy-saving control method comprising:
providing a mechanical switch set on the cable interface, wherein the mechanical switch has a first end and a second end, and the second end is an output end of the mechanical switch;
providing a controller, and connecting an input terminal of the controller to the output end of the mechanical switch so as to output a switching control signal through an output terminal of the controller;
providing a power converter for receiving the switching control signal from the controller, wherein the power converter is operated according to the switching control signal.

18. The energy-saving control method of claim 17, wherein when a connection cable is plugged into the cable interface, the mechanical switch outputs a first signal to the controller, and the controller outputs a first switching control signal corresponding to the first signal to control the power converter to be operated at a normal mode.

19. The energy-saving control method of claim 17, wherein when a connection cable is removed from the cable interface, the mechanical switch outputs a second signal to the controller, and the controller outputs a second switching control signal corresponding to the second signal to control the power converter to be operated at a hiccup mode.

20. The energy-saving control method of claim 17, wherein the cable interface is a USB interface or has a circular jack structure.

* * * * *